(12) United States Patent
Cotoros et al.

(10) Patent No.: US 11,700,443 B2
(45) Date of Patent: Jul. 11, 2023

(54) CAMERA WITH RECONFIGURABLE LENS ASSEMBLY

(71) Applicant: GoPro, Inc., San Mateo, CA (US)

(72) Inventors: Ingrid Anda Cotoros, Hillsborough, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/627,238

(22) PCT Filed: Jul. 13, 2020

(86) PCT No.: PCT/US2020/041791
§ 371 (c)(1),
(2) Date: Jan. 14, 2022

(87) PCT Pub. No.: WO2021/011463
PCT Pub. Date: Jan. 21, 2021

(65) Prior Publication Data
US 2022/0239811 A1      Jul. 28, 2022

Related U.S. Application Data

(60) Provisional application No. 62/875,627, filed on Jul. 18, 2019.

(51) Int. Cl.
*H04N 5/335*     (2011.01)
*H04N 23/55*     (2023.01)
(Continued)

(52) U.S. Cl.
CPC ............. *H04N 23/55* (2023.01); *G03B 17/14* (2013.01); *G03B 17/565* (2013.01);
(Continued)

(58) Field of Classification Search
CPC .................................................... G03B 17/565
See application file for complete search history.

(56) References Cited

U.S. PATENT DOCUMENTS 11,477,356 B2 * 10/2022 Ikeda ................. H04N 5/23245
2004/0120701 A1    6/2004 Dirisio
2018/0224720 A1 *  8/2018 Pan ....................... H04N 5/2254

FOREIGN PATENT DOCUMENTS

JP    2018036354 A  *  3/2018
JP    2018036354 A      3/2018

OTHER PUBLICATIONS

International Search Report and Written Opinion for App. No. PCT/US2020/041791, dated Oct. 15, 2020, 8 pages.
(Continued)

*Primary Examiner* — Gary C Vieaux
(74) *Attorney, Agent, or Firm* — Young Basile Hanlon & MacFarlane, P.C.

(57) ABSTRACT

Systems and processes for cameras with a reconfigurable lens assembly are described. For example, some methods include automatically detecting that an accessory lens structure has been mounted to an image capture device including a mother lens and an image sensor configured to detect light incident through the mother lens, such that an accessory lens of the accessory lens structure is positioned covering the mother lens; responsive to detecting that the accessory lens structure has been mounted, automatically identifying the accessory lens from among a set of multiple supported accessory lenses; accessing an image captured using the image sensor when the accessory lens structure is positioned covering the mother lens; determining a warp mapping based on identification of the accessory lens; applying the warp mapping to the image to obtain a warped image; and transmitting, storing, or displaying an output image based on the warped image.

20 Claims, 14 Drawing Sheets

(51) Int. Cl.
*G03B 17/14* (2021.01)
*G03B 17/56* (2021.01)
*H04N 23/80* (2023.01)
*H04N 23/63* (2023.01)
*H04N 23/60* (2023.01)
*H04N 23/68* (2023.01)

(52) U.S. Cl.
CPC ......... *H04N 23/634* (2023.01); *H04N 23/665* (2023.01); *H04N 23/683* (2023.01); *H04N 23/80* (2023.01); *G03B 2206/00* (2013.01)

(56) References Cited

OTHER PUBLICATIONS

Derek Clark Photography, Fujifilm X100F: Auto Detect WCL & TCL Lenses Blog, Mar. 1, 2019, http://www.derekclarkphotography.com/blog/fujifilm-x100f-auto-detect-wcl-amp-tcl-lenses, 7 pages.
International Preliminary Report on Patentability for App. No. PCT/US2020/041791, dated Jan. 27, 2022, 7 pages.

* cited by examiner

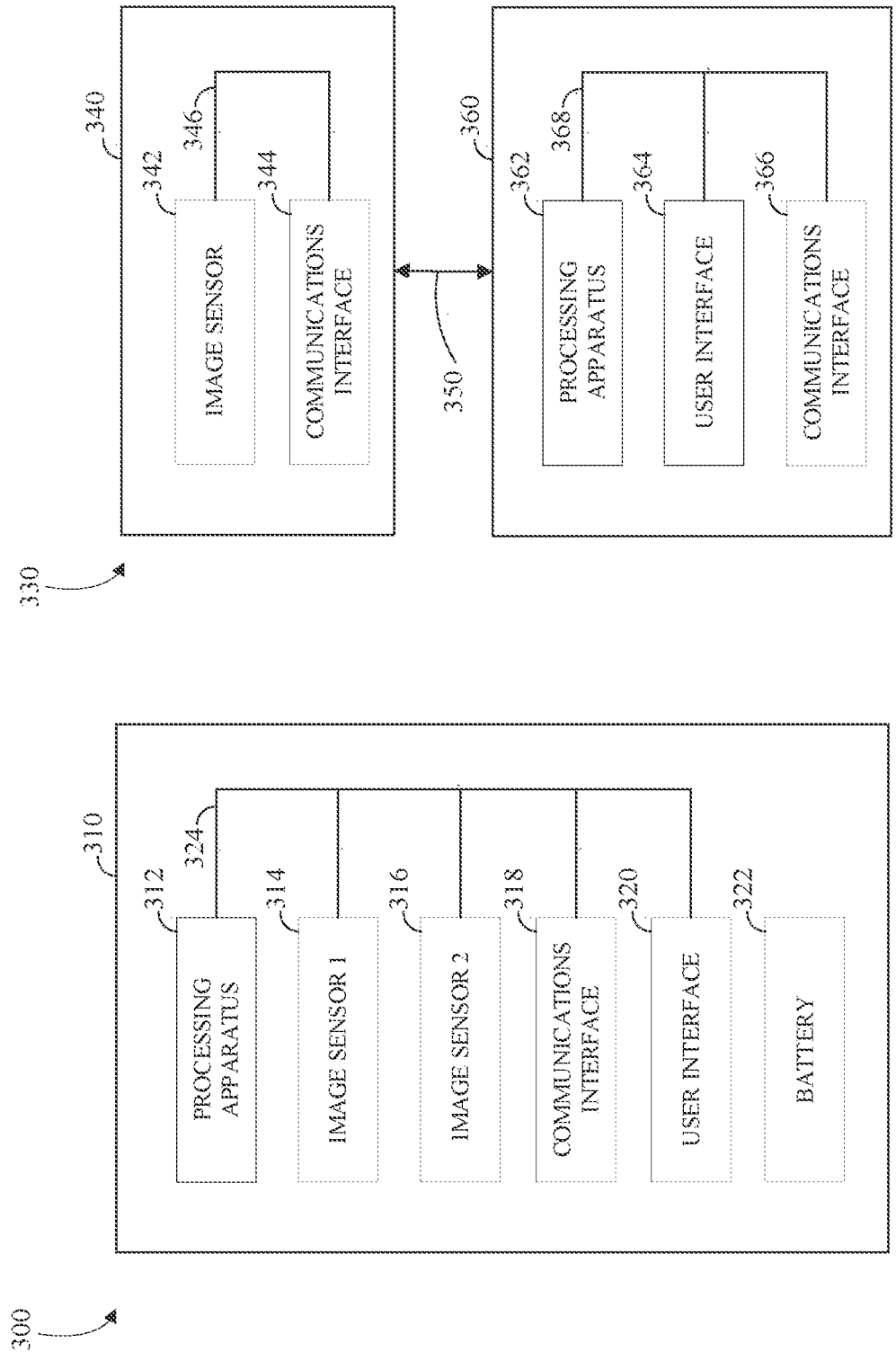

CAMERA WITH RECONFIGURABLE LENS ASSEMBLY

CROSS-REFERENCE TO RELATED APPLICATIONS

This application is a 371 of International Application No. PCT/US2020/041791 filed on Jul. 13, 2020, which claims the priority to U.S. Provisional Application No. 62/875,627, filed on Jul. 18, 2019, the entire disclosures of which are hereby incorporated by reference.

TECHNICAL FIELD

This disclosure relates to cameras with a reconfigurable lens assembly.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Optical properties of a lens of an image capture device may limit applications of the image capture device. Signal processing may be applied to captured images to optical distortion caused by a lens used to capture the image.

SUMMARY

Disclosed herein are implementations of cameras with a reconfigurable lens assembly.

In a first aspect, the subject matter described in this specification can be embodied in systems that include an image capture device including a mother lens and an image sensor configured to detect light incident through the mother lens; an accessory lens structure including an accessory lens and a retaining mechanism configured to fasten the accessory lens in a position covering the mother lens in a first arrangement and configured to disconnect the accessory lens from the image capture device in a second arrangement, wherein the accessory lens augments optical properties of a lens stack over the image sensor that includes the mother lens when the retaining mechanism is in the first arrangement; a non-volatile memory storing more than two bits of data that is integrated in the accessory lens structure; and a processing apparatus that is integrated in the image capture device and configured to: receive data that is stored in the non-volatile memory when the retaining mechanism is in the first arrangement.

In the first aspect, the non-volatile memory may store an identifier of the accessory lens. In the first aspect, the non-volatile memory may store calibration data of the accessory lens. In the first aspect, the non-volatile memory may store optical parameters of the accessory lens. In the first aspect, the systems may further include a communication interface that is integrated in the accessory lens structure, and the processing apparatus may be configured to receive data stored in the non-volatile memory as signals transmitted via the communications interface. In the first aspect, the communications interface may include a radio-frequency identification tag and the image capture device includes a radio-frequency identification reader configured to read signals from the radio-frequency identification tag. In the first aspect, the communications interface may include one or more electrical conductors configured to contact one or more corresponding electrical conductors on the image capture device when the retaining mechanism is in the first arrangement. In the first aspect, the processing apparatus may be configured to determine a warp mapping based on the data received from the non-volatile memory; and apply the warp mapping to an image captured using the image sensor when the retaining mechanism is in the first arrangement. In the first aspect, the processing apparatus may be configured to automatically detect when the retaining mechanism is in the first arrangement. In the first aspect, the processing apparatus may be configured to, responsive to detecting that the accessory lens structure has been mounted, prompt a user, via a user interface, to confirm a lens configuration change. In the first aspect, the processing apparatus may be configured to, responsive to detecting that the accessory lens structure has been mounted, automatically identify the accessory lens from among a set of multiple supported accessory lenses. In the first aspect, a field of view of the lens stack may be projected as a circle within a detectable area of the image sensor when the retaining mechanism is in the first arrangement, and the processing apparatus may be configured to access an image captured using the image sensor when the retaining mechanism is in the first arrangement; apply an electronic image stabilization rotation to the image to obtain a stabilized image; and crop the stabilized image to a rectangular output image from within the circle. The first aspect may include any combination of the features described in this paragraph.

In a second aspect, the subject matter described in this specification can be embodied in methods that include automatically detecting that an accessory lens structure has been mounted to an image capture device including a mother lens and an image sensor configured to detect light incident through the mother lens, such that an accessory lens of the accessory lens structure is positioned covering the mother lens; responsive to detecting that the accessory lens structure has been mounted, automatically identifying the accessory lens from among a set of multiple supported accessory lenses; accessing an image captured using the image sensor when the accessory lens structure is positioned covering the mother lens; determining a warp mapping based on identification of the accessory lens; applying the warp mapping to the image to obtain a warped image; and transmitting, storing, or displaying an output image based on the warped image.

In the second aspect, when the accessory lens structure is positioned covering the mother lens, a field of view of a lens stack including the accessory lens and the mother lens is projected as a circle within a detectable area of the image sensor, the method may include applying an electronic image stabilization rotation to the image to obtain a stabilized image; and cropping the stabilized image to a rectangular output image from within the circle. In the second aspect, the method may include, responsive to detecting that the accessory lens structure has been mounted, prompting a user, via a user interface, to confirm a lens configuration change. In the second aspect, automatically detecting that the accessory lens structure has been mounted to the image capture device may include using a proximity sensor integrated in the image capture device. In the second aspect, automatically detecting that the accessory lens structure has been mounted to the image capture device may include detecting a change in image sensor coverage of the image sensor. In the second aspect, automatically identifying the accessory lens may include receiving data from a non-volatile memory integrated in the accessory lens structure. In the second aspect, automatically identifying the accessory lens may include comparing image sensor coverage of the image sensor to an image sensor coverage profile associated with the accessory lens. The second aspect may include any combination of the features described in this paragraph.

In a third aspect, the subject matter described in this specification can be embodied in systems that include an image capture device including a mother lens and an image sensor configured to detect light incident through the mother lens; an accessory lens structure including an accessory lens and a retaining mechanism configured to fasten the accessory lens in a position covering the mother lens in a first arrangement and configured to disconnect the accessory lens from the image capture device in a second arrangement, wherein the accessory lens augments optical properties of a lens stack over the image sensor that includes the mother lens, such that a field of view of the lens stack is projected as a circle within a detectable area of the image sensor, when the retaining mechanism is in the first arrangement; and a processing apparatus that is integrated in the image capture device and configured to: access an image captured using the image sensor when the retaining mechanism is in the first arrangement; apply an electronic image stabilization rotation to the image to obtain a stabilized image; and crop the stabilized image to a rectangular output image from within the circle.

In the third aspect, the processing apparatus may be configured to automatically detect when the retaining mechanism is in the first arrangement. In the third aspect, the processing apparatus may be configured to, responsive to detecting that the accessory lens structure has been mounted, prompt a user, via a user interface, to confirm a lens configuration change. In the third aspect, the processing apparatus may be configured to, responsive to detecting that the accessory lens structure has been mounted, automatically identify the accessory lens from among a set of multiple supported accessory lenses. The third aspect may include any combination of the features described in this paragraph.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
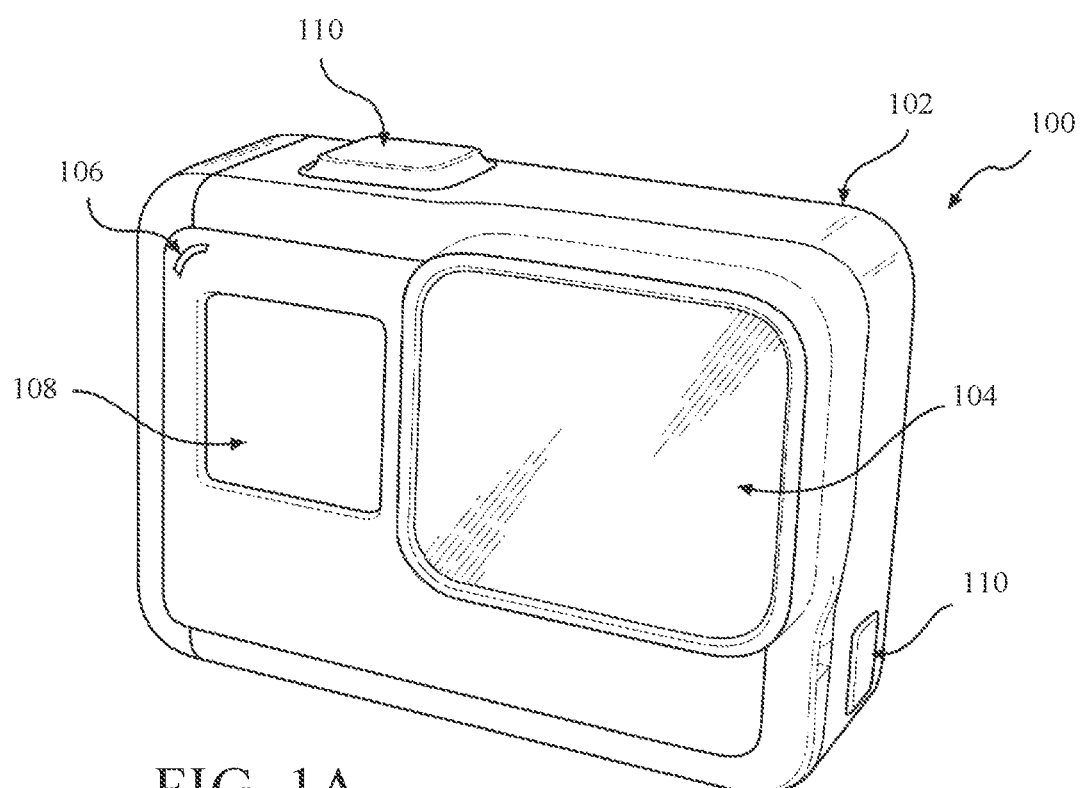
FIGS. 1A-D are isometric views of an example of an image capture device.

Systems and methods for cameras with a reconfigurable lens are described below. As built, a single imaging head camera's functionality is limited by its sensor resolution and lens field of view. While many uses can be derived from such a singular configuration, a lot of other use cases are out of bounds. This in effect limits the usability of such a camera.

Reconfigurable lens cameras are described herein, in which, by adding an accessory lens in front of the main outer lens, or mother lens, optical parameters of a lens stack including the mother lens are significantly altered. For example, the resulting reconfigured lens may have a significantly different field of view and/or distortion than those of the mother lens. For example, the mother lens can work without an accessory lens to offer a specific set of modes and use cases, but also in combination with an accessory lens, to offer a different set of modes supporting different use cases.

When the mother lens is reconfigured with the accessory lens, the image capture device (e.g., a main camera including the mother lens) identifies the reconfigured lens using one or more of a variety of available sensing modalities. For example, proximity sensing (e.g., using a magnetically actuated switch) may be used to detect the presence of an accessory lens. For example, changes in imaging sensor coverage caused by the addition of the accessory lens may be detected to detect the presence of an accessory lens. The image capture device may then reconfigure an internal image processing pipeline to work with the new reconfigured lens to offer the user access to a new sets of modes. For example, these new modes may include new image processing configurations and tuning.

In addition to detection of the accessory lens as present covering the mother lens, the image capture device may also identify which accessory lens is mounted over the mother lens (e.g., where multiple accessory lenses are built to work with the mother lens and provide for additional use cases). In some implementations, it can be useful that specific accessory lens information is loaded in non-volatile storage present with the accessory lens as part of an accessory lens structure used to mount the accessory lens over the mother lens. Such information may include, for example, an accessory lens identifier, identification of a mother lens the accessory lens is designed to work with, accessory lens characteristics (e.g., optical parameters) and/or accessory lens calibration data. This information stored in the non-volatile memory may be read (e.g., using a communication interface built into the accessory lens structure) by the image capture device (e.g., a camera) and aid in the image capture device reconfiguring itself to work with the reconfigured lens.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
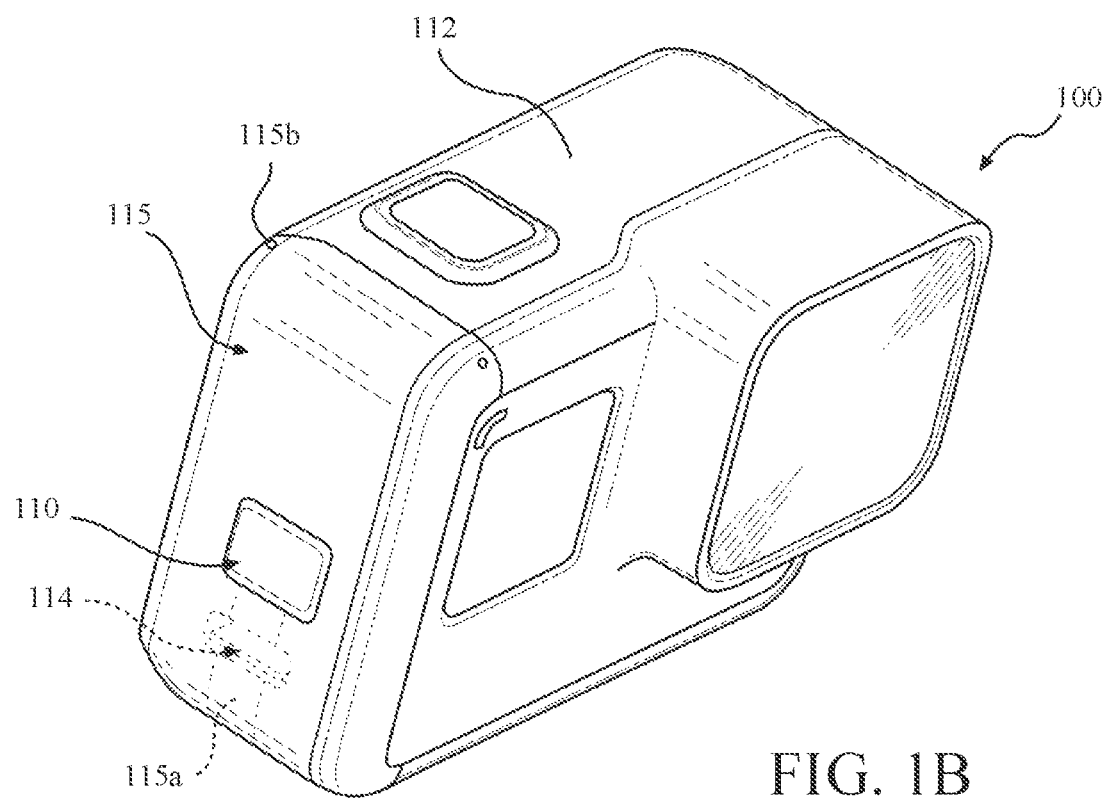
Figure 1C:
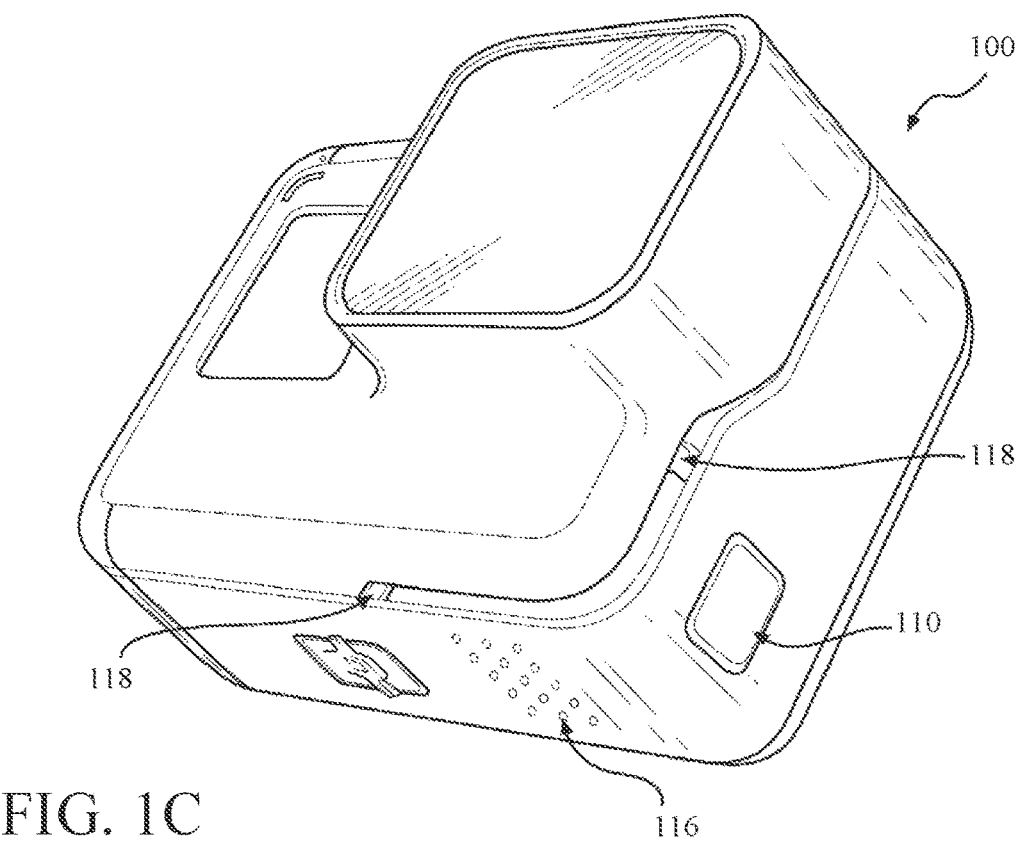
Figure 1D:
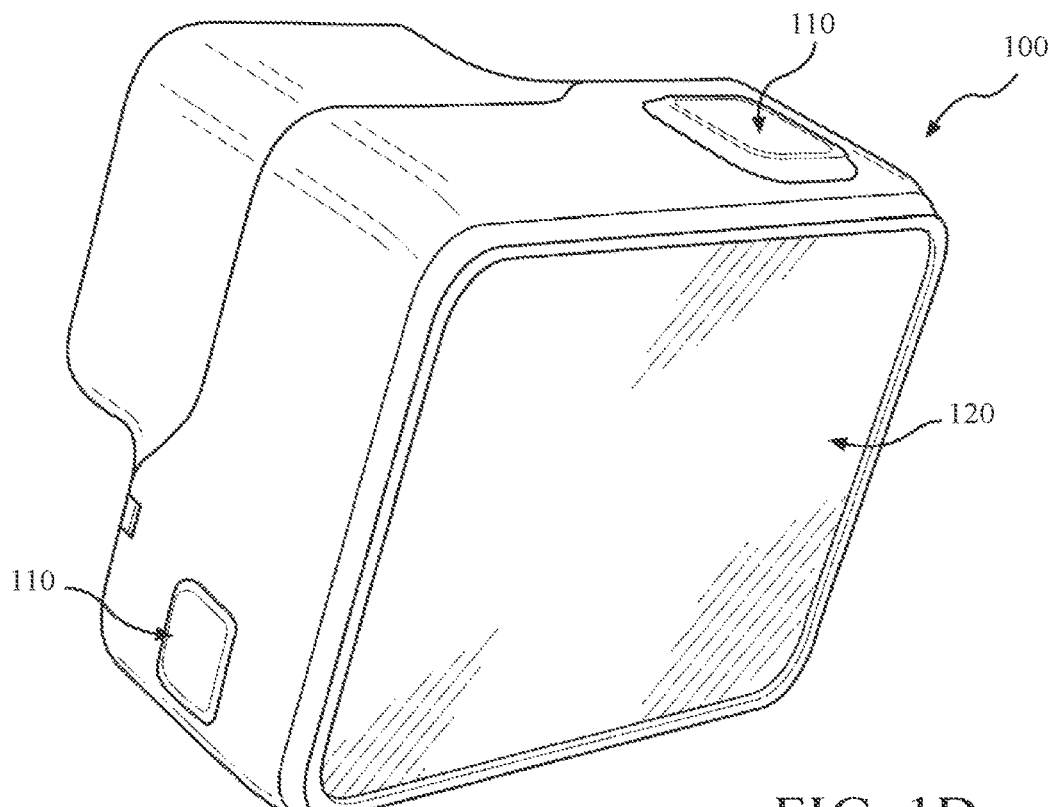

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
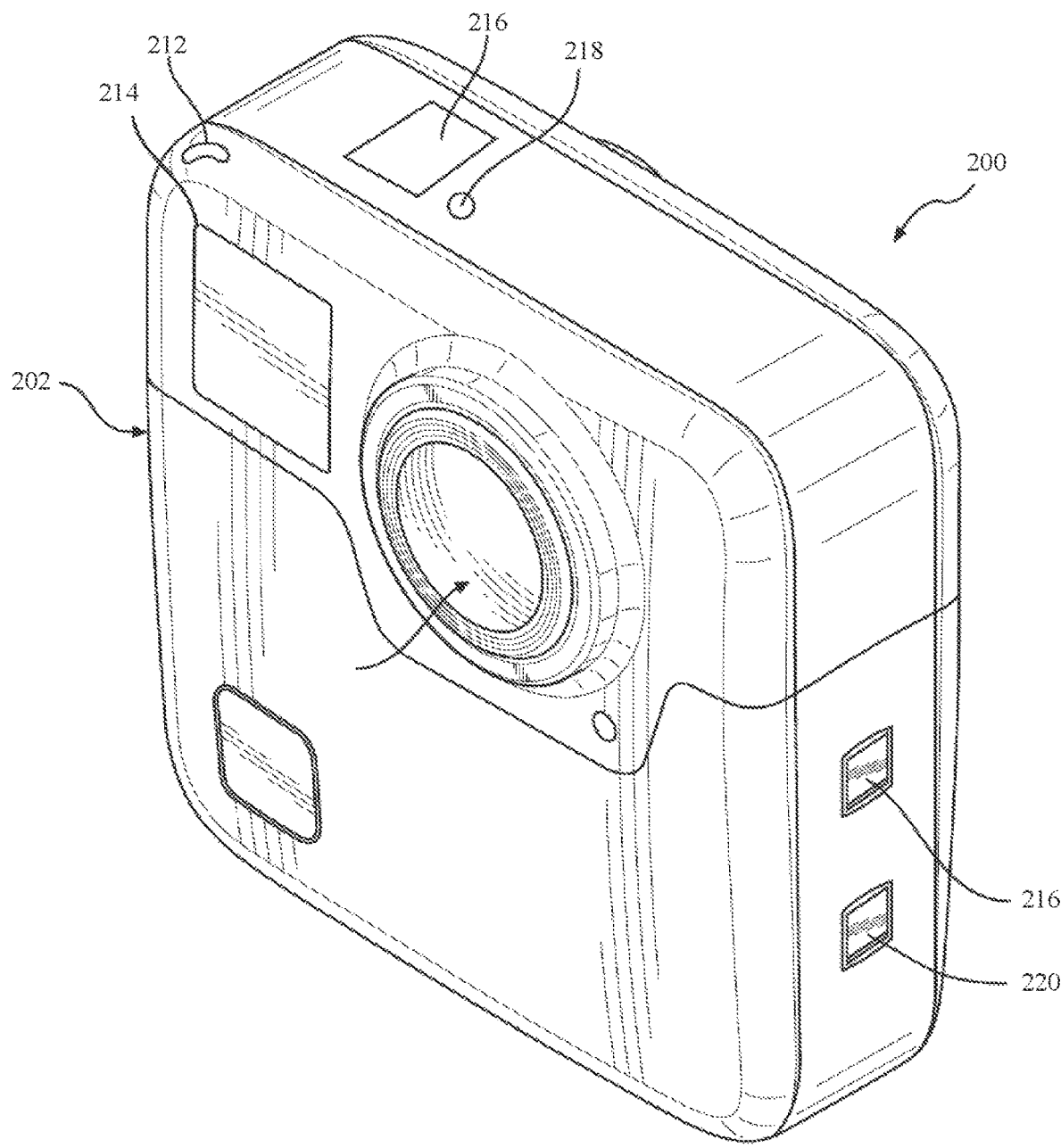
FIGS. 2A-B are isometric views of another example of an image capture device.
Figure 2B:
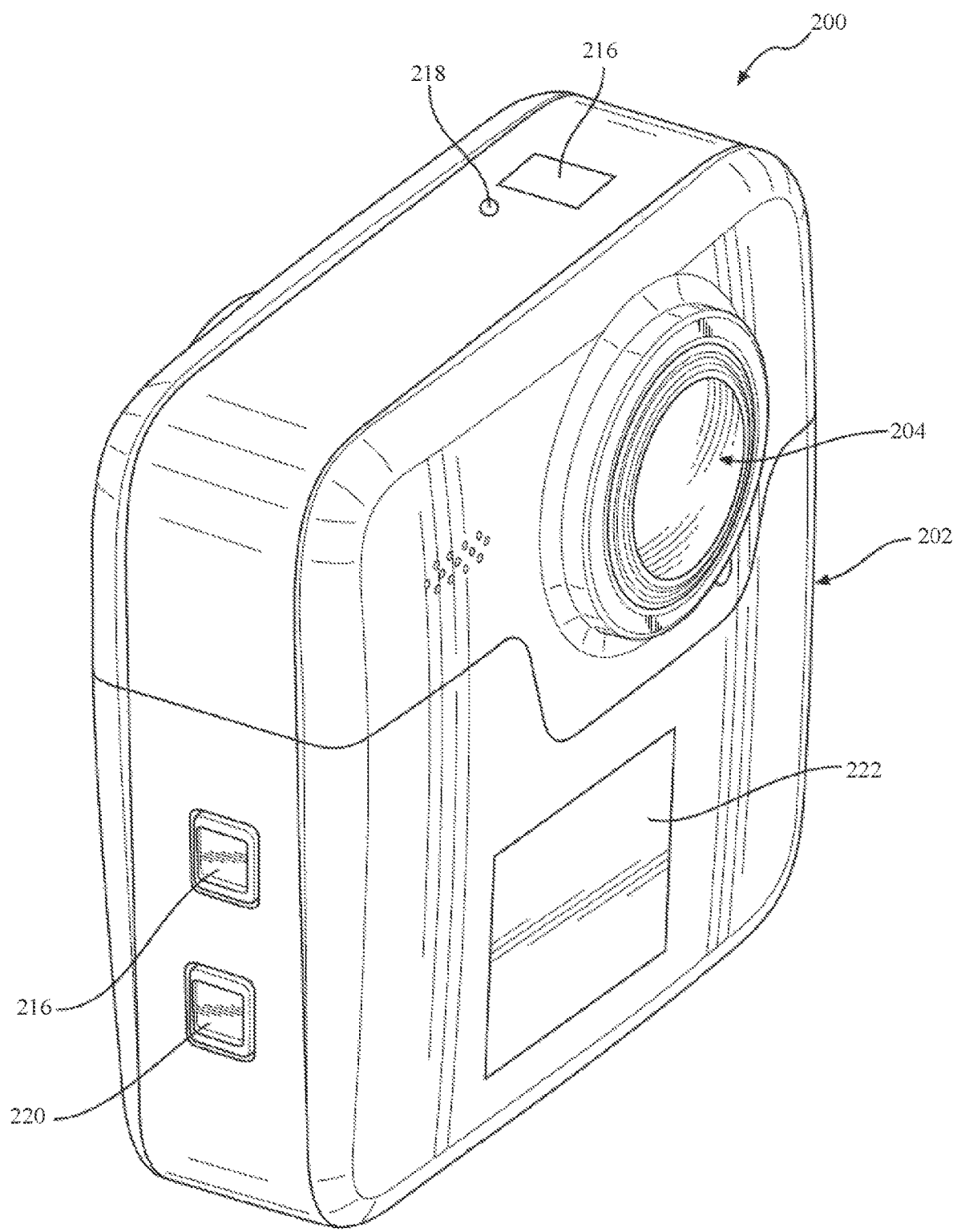

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
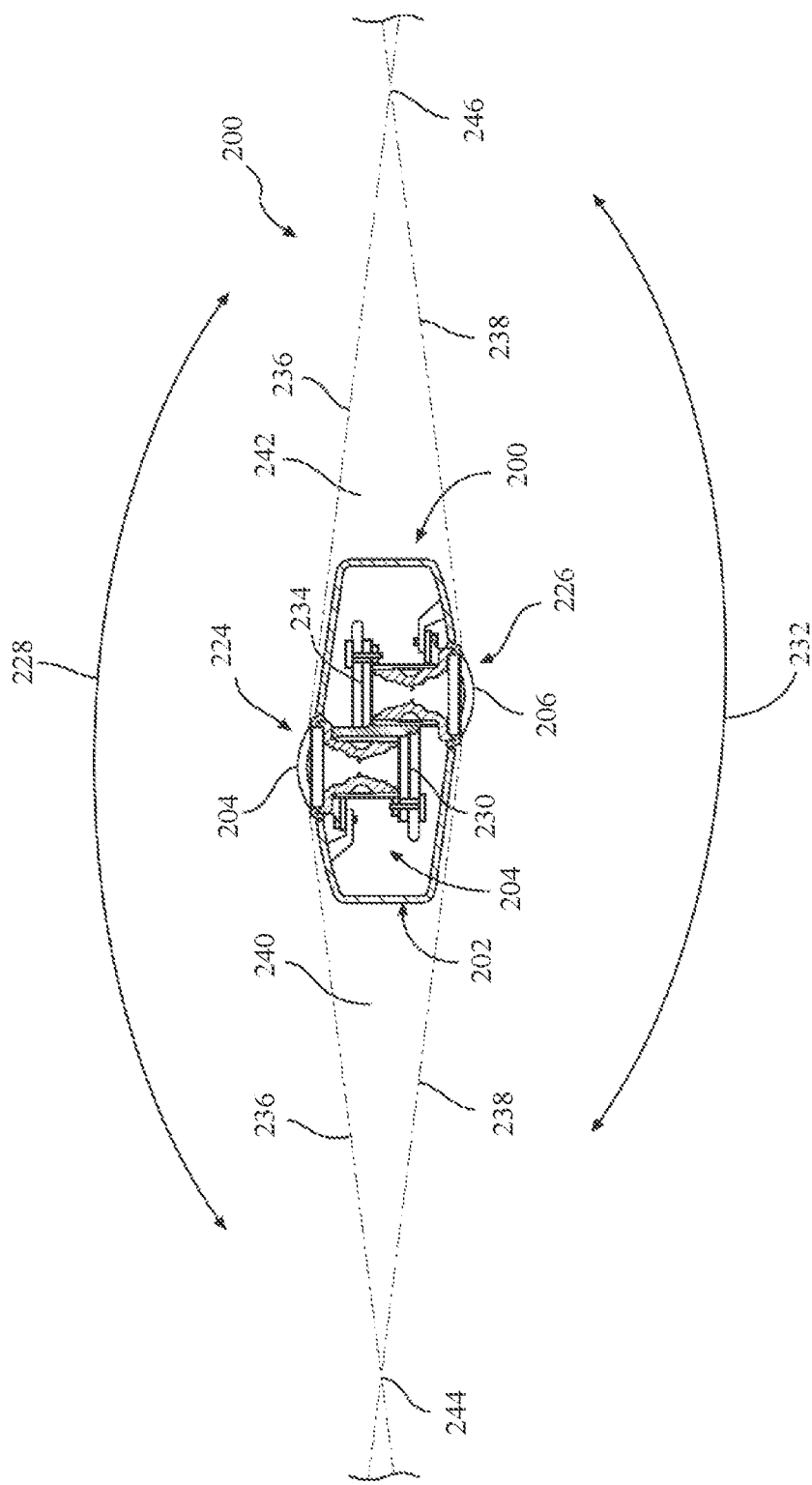
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 6:
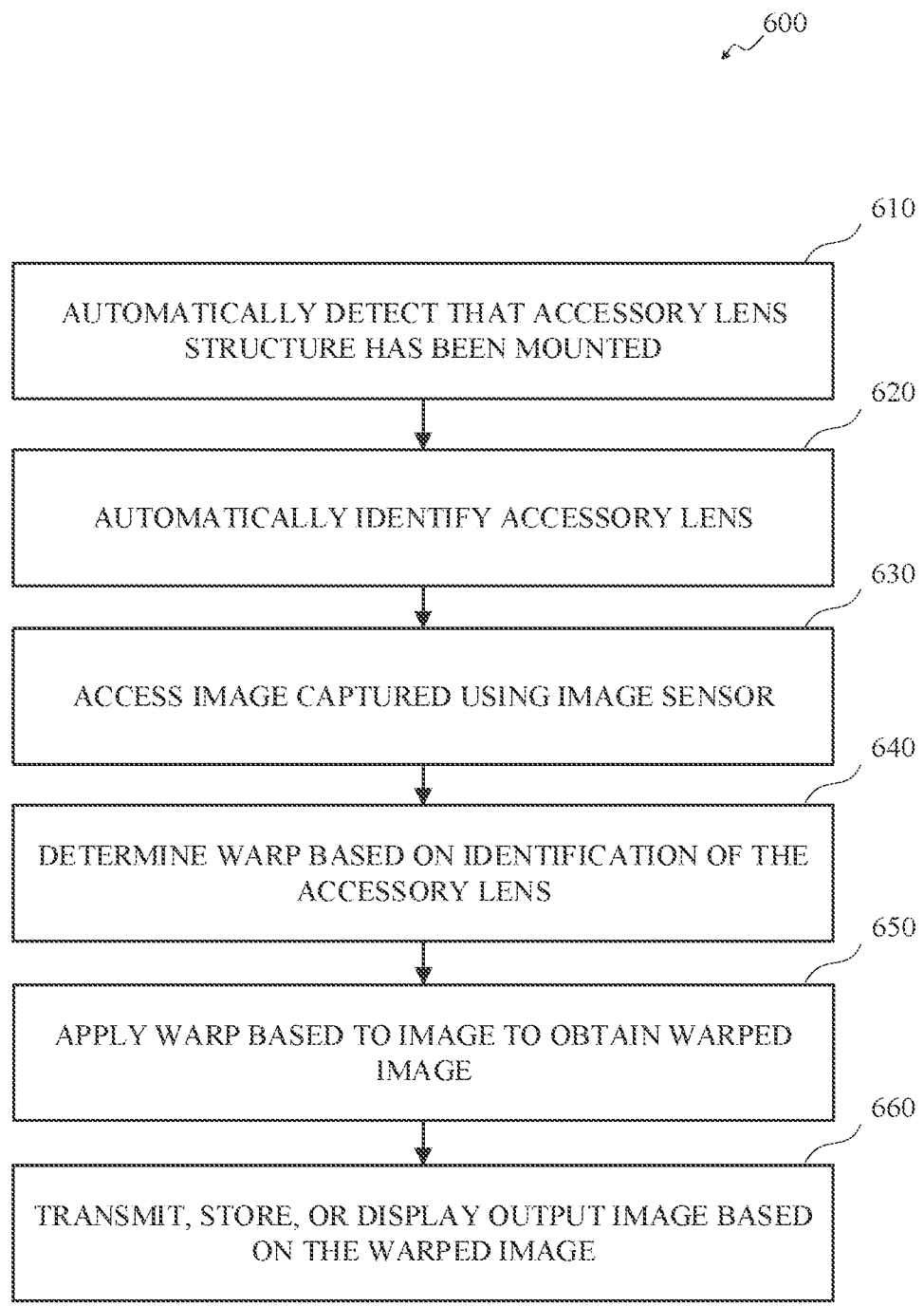
FIG. 6 is a flowchart of an example of a process for using an accessory lens structure with an image capture device.
Figure 7:
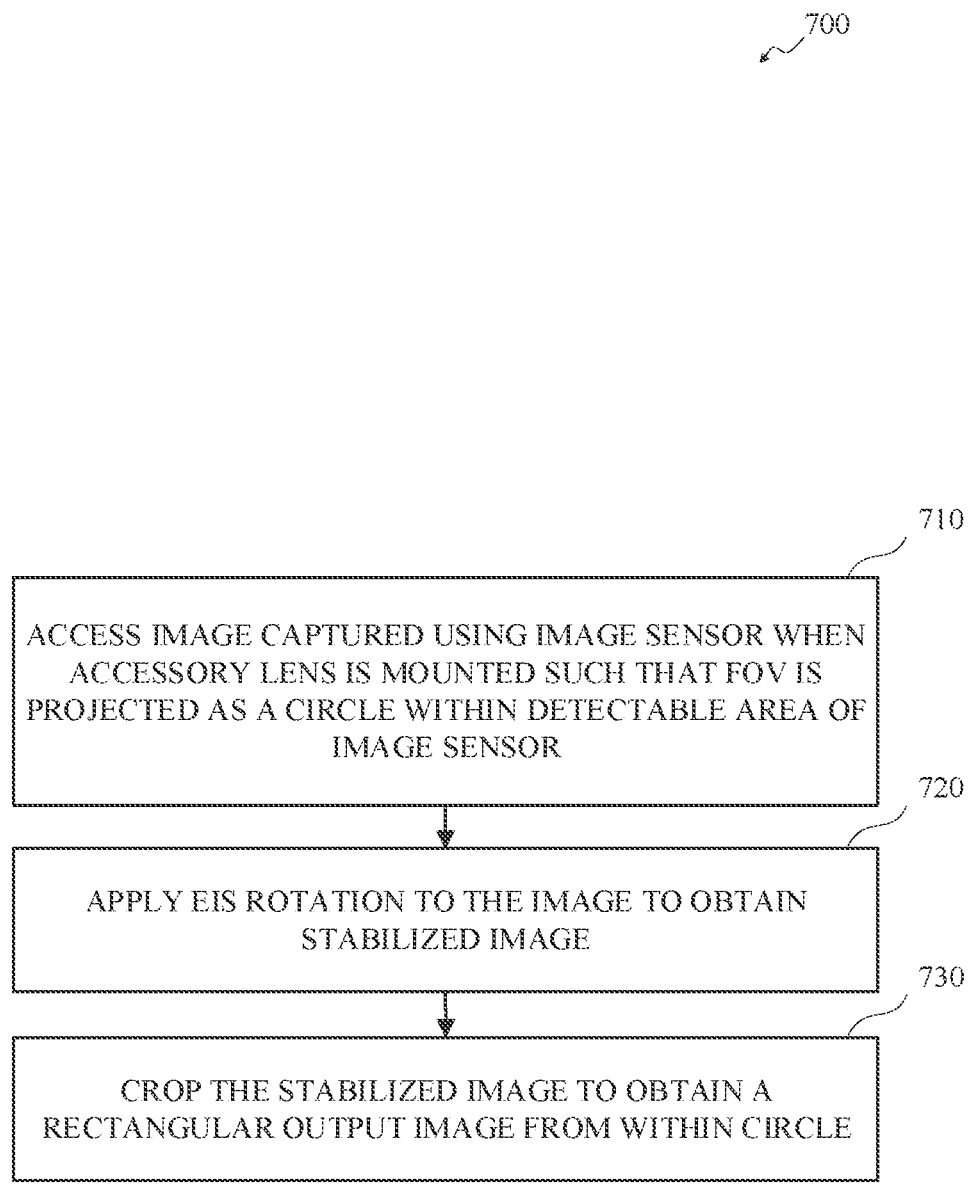
FIG. 7 is a flowchart of an example of a process for improving electronic image stabilization using an accessory lens structure with an image capture device.

The image capture system 300 may implement some or all of the techniques described in this disclosure, such as the process 600 described in FIG. 6 and/or the process 700 described in FIG. 7.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture device 340 and/or the personal computing device 360 may be used to implement some or all of the techniques described in this disclosure, such as the process 600 of FIG. 6 and/or the process 700 described in FIG. 7.

Figure 4A:
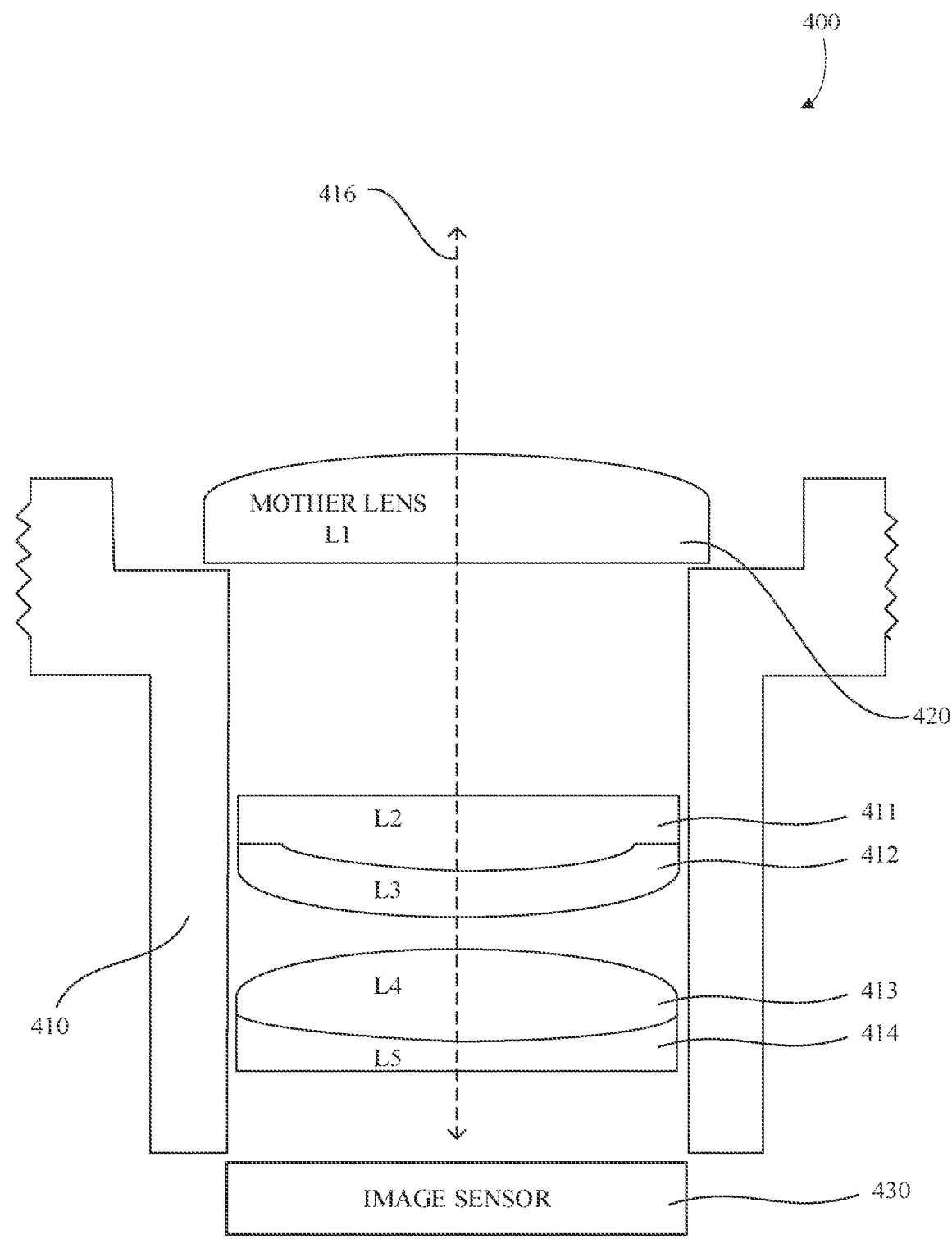
FIG. 4A illustrates a cross-sectional side view of an example of lens assembly including a mother lens and an image sensor.
Figure 4B:
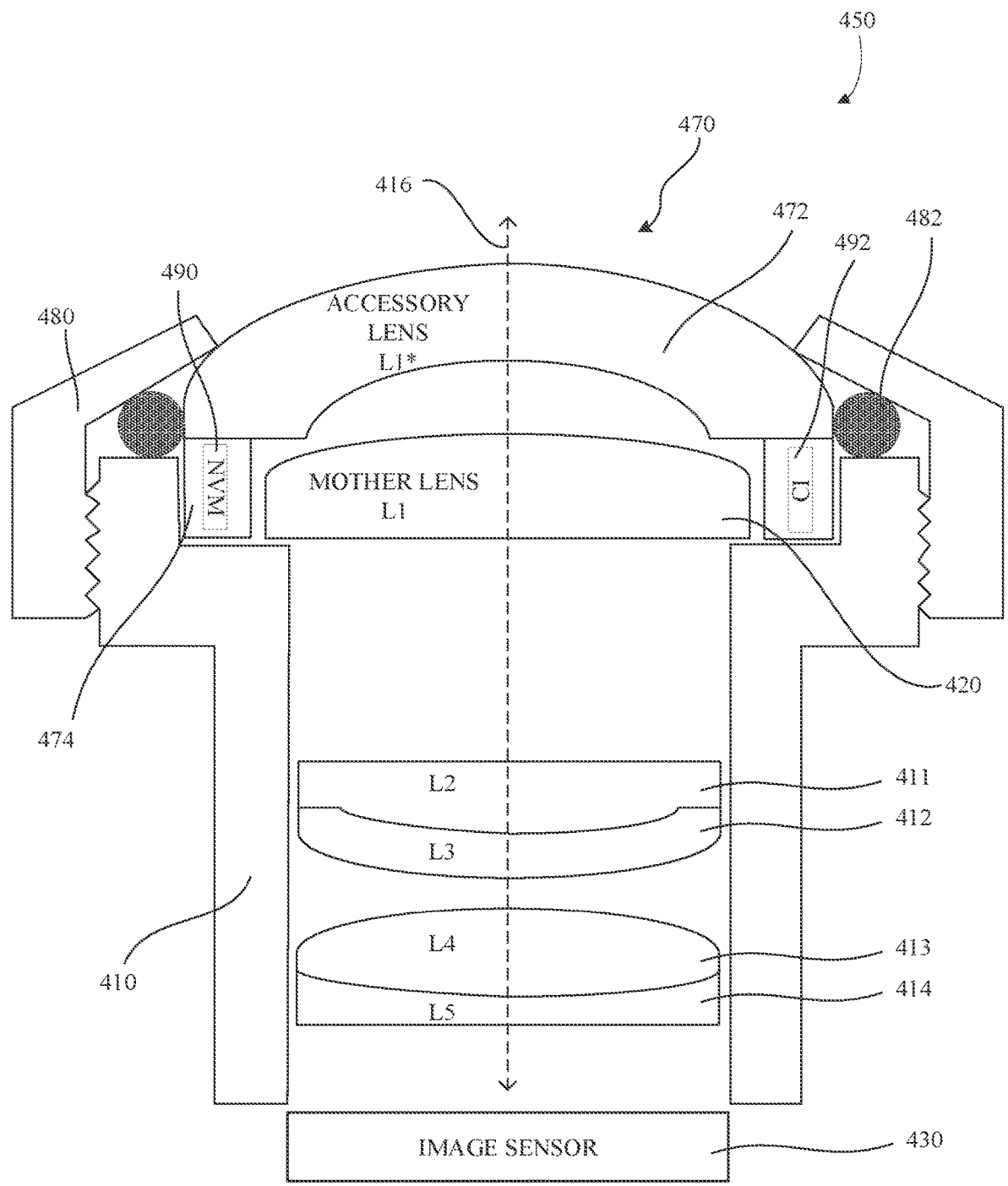
FIG. 4B illustrates a cross-sectional side view of an example of a system including an accessory lens structure mounted over a lens assembly including a mother lens and an image sensor.

FIGS. 4A and 4B illustrate an example of a lens assembly 400 with (4B) and without (4A) an optional accessory lens 470 attached to alter the optical properties of the lens assembly 400.

FIG. 4A illustrates a cross-sectional side view of an example of a lens assembly 400 including a mother lens 420 and an image sensor 430. The lens assembly 400 includes a lens barrel 410 including multiple inner lenses 411, 412, 413, and 414; a mother lens 420; and an image sensor 430. For example, the lens assembly 400 may be implemented as part of an image capture device, such as the image capture device 100 of FIGS. 1A-1D, the image capture device 200 of FIGS. 2A-2B, the image capture device 310 of FIG. 3A, or the image capture device 340 of FIG. 3B.

The lens assembly 400 includes a lens barrel 410 in a body of an image capture device. The lens barrel 410 may be an integrated part of a body of an image capture device. The lens barrel 410 includes multiple inner lenses 411, 412, 413, and 414. In some implementations, at least one of the multiple inner lenses 411, 412, 413, and 414 is curved. In the depicted example, the lens barrel 410 includes a curved inner lens 412. The curved inner lens 412 may refract light propagating through the lens barrel 410 to focus the light for capture by the image sensor 430. The lens barrel 410 includes a second curved inner lens 414. For example, the inner lenses 411, 412, 413, and 414 may be attached (e.g., using glue and/or ledges and flanges (not shown)) to inner walls of the lens barrel 410. The inner lenses 411, 412, 413, and 414 may be oriented to direct light from a first end of the lens barrel 410, roughly parallel to an optical axis 416 of the lens barrel 410 to a second end of the lens barrel 410, where the light may be detected by the image sensor 430 to capture an image.

The lens assembly 400 includes a mother lens 420 positioned at an opposite end of the lens barrel from the image sensor 430. The mother lens 420 is an outer (L1) lens of the lens assembly 400. The lens assembly 400 may be used to capture images with the mother lens 420 exposed as the outer lens. The lens assembly 400, with the mother lens 420 as the outer lens, has optical parameters (e.g., a field of view and a distortion profile) that can be used to support a first set of image capture modes. An image capture device that includes the lens assembly 400 may include a processing apparatus (e.g., the processing apparatus 312) that is configured to perform signal processing on images captured using the lens assembly 400 including applying a warp based on optical parameters of the lens assembly 400. For example, the lens assembly 400, with the mother lens 420 as the outer lens, may have a narrow field of view or a wide field of view, and it may have one of many possible distortion profiles (e.g., rectilinear, fisheye, or anamorphic).

The lens assembly 400 includes an image sensor 430 mounted within a body of an image capture device at a second end of the lens barrel 410. The image sensor 430 may be configured to capture images based on light incident on the image sensor through the mother lens 420 and the inner lenses 411, 412, 413, and 414. The image sensor 430 may be configured to detect light of a certain spectrum (e.g., the visible spectrum or the infrared spectrum) and convey information constituting an image as electrical signals (e.g., analog or digital signals). For example, the image sensor 430 may include charge-coupled devices (CCDs) or active pixel sensors in complementary metal-oxide-semiconductor (CMOS). In some implementations, the image sensor 430 includes a digital-to-analog converter. For example, the image sensor 430 may be configured to capture image data using a plurality of selectable exposure times.

FIG. 4B illustrates a cross-sectional side view of an example of a system 450 including an accessory lens structure 470 mounted over the lens assembly 400 including the mother lens 420 and the image sensor 430. For example, the lens assembly 400 may be implemented as part of an image capture device, such as the image capture device 100 of FIGS. 1A-1D, the image capture device 200 of FIGS. 2A-2B, the image capture device 310 of FIG. 3A, or the image capture device 340 of FIG. 3B. The accessory lens structure 470 includes an accessory lens 472 and a retaining mechanism 480 configured to fasten the accessory lens 472 in a position covering the mother lens 420 in a first arrangement and configured to disconnect the accessory lens 472 from the image capture device in a second arrangement. The accessory lens structure 470 includes an interface ring 474 attached to a base of the accessory lens 472 and configured to support the accessory lens 472 in position over the mother lens 420 at the end of the lens barrel 410 when the retaining mechanism 480 is in the first arrangement. The system 450 includes an O-ring 482 for waterproofing. The system 450 includes a non-volatile memory 490 storing more than two bits of data that is integrated in the accessory lens structure 470; and a communication interface 492 integrated in the accessory lens structure 470. For example, the non-volatile memory 490 may store data that identifies the accessory lens 472, which can be read, via the communications interface 492, by a processing apparatus of the image capture device and used to configure an image processing pipeline of the image capture device to process images captured using the accessory lens 472. For example, system 450 may implement some or all of the techniques described in this disclosure, such as the process 600 described in FIG. 6 and/or the process 700 described in FIG. 7.

The accessory lens structure 470 includes an accessory lens 472 and a retaining mechanism 480 configured to fasten the accessory lens 472 in a position covering the mother lens 420 in a first arrangement and configured to disconnect the accessory lens 472 from the image capture device in a second arrangement. The accessory lens 472 augments optical properties of a lens stack over the image sensor that includes the mother lens 420 when the retaining mechanism is in the first arrangement. For example, the accessory lens 472 may be used to provide a different field of view (e.g., fisheye, narrow, portrait, macro, or telephoto) for the image capture device than the field of view with the mother lens 420 serving as the outer lens. For example, the accessory lens 472 may be used to provide a different optical distortion (e.g., rectilinear, fisheye, or anamorphic) for the image capture device than the optical distortion with the mother lens 420 serving as the outer lens. For example, the accessory lens 472 may augment the optical properties of the lens stack including the mother lens 420 in such a way as to facilitate robust image stabilization processing. For example, when the retaining mechanism 480 is in the first arrangement, a field of view of the lens stack may be projected as a circle within a detectable area of the image sensor 430. In some implementations, the processing apparatus is configured to: access an image captured using the image sensor 430 when the retaining mechanism 480 is in the first arrangement; apply an electronic image stabilization rotation to the image to obtain a stabilized image; and crop the stabilized image to a rectangular output image from within the circle.

The retaining mechanism 480 may include a fastening mechanism configured to facilitate transition between the first arrangement and the second arrangement by removably fastening the retaining mechanism 480 to the lens barrel 410 or another nearby portion of the body of the image capture device. In the example depicted in FIG. 4B, a threaded mechanism is employed to fasten the retaining mechanism 480 to the lens barrel 410 and fasten the accessory lens 472 in a position covering a first end of the lens barrel 410. In some implementations (not shown in FIG. 4B), a retaining mechanism 480 may employ other fastening mechanisms to secure a retaining ring to a body of an image capture device. For example, a retaining mechanism may include a bayonet mechanism (e.g., such as the bayonet mechanism described in relation to FIG. 5A) configured to facilitate transition between the first arrangement and the second arrangement. For example, a retaining mechanism may include a threaded mechanism (e.g., such as the threaded mechanism described in relation to FIG. 5B) configured to facilitate transition between the first arrangement and the second arrangement. For example, a retaining mechanism may include a snapring mechanism (e.g., such as the snap-ring mechanism described in relation to FIG. 5C) configured to facilitate transition between the first arrangement and the second arrangement. For example, a retaining mechanism may include screw holes that enable screws to fasten the retaining ring to the body in the first arrangement (e.g., as described in relation to FIG. 5D).

In some implementations, the retaining mechanism 480 is glued to the accessory lens 472. In some implementations, the accessory lens 472 is secured in the retaining mechanism 480 as a captured mount, such that the accessory lens 472 may be rotated within the retaining mechanism 480. For example, the accessory lens 472 and the retaining mechanism 480 may be interlocked (e.g., using a flange and slot interface around a circumference of the accessory lens 472) and travel together but the accessory lens 472 may still be loose enough to turn inside the retaining mechanism 480 independently. In some implementations, the accessory lens 472 is firmly held in a fixed orientation in the first arrangement by a friction lock formed by pressing the retaining mechanism 480 against the accessory lens 472 in its position covering the first end of the lens barrel 410.

The system 450 includes an O-ring 482 for waterproofing that is positioned radially around the accessory lens 472. The O-ring may be composed of a rubbery material. For example, the O-ring 482 may be positioned to be compressed between the retaining mechanism 480, the accessory lens 472 and the body (e.g., the lens barrel 410) of the image capture device to form a waterproofing seal. In some implementations, the O-ring 482 may be glued to the retaining mechanism 480 and/or to the accessory lens 472.

Although not shown in FIG. 4B, the system 450 includes a processing apparatus (e.g., the processing apparatus 312), integrated in the image capture device that includes the lens assembly 400. The processing apparatus is configured to: receive data that is stored in the non-volatile memory 490 when the retaining mechanism is in the first arrangement. For example, the non-volatile memory 490 may store an identifier of the accessory lens 472. For example, the non-volatile memory 490 may store calibration data of the accessory lens 472. For example, the non-volatile memory 490 may store optical parameters of the accessory lens 472. For example, the non-volatile memory 490 may include a read only memory (ROM). For example, the non-volatile memory 490 may include a flash drive.

In some implementations, the processing apparatus is configured to automatically detect when the retaining mechanism 480 is in the first arrangement. For example, sensing modalities, such as proximity sensing (e.g., using a capacitive coupling, using electrical contacts between the accessory lens structure 470 and the lens assembly 400, and/or using a magnetically actuated switch in the image capture device and a magnet in the accessory lens structure 470) and/or detecting changes in image sensor coverage caused by the accessory lens 472, may be used automatically detect when the retaining mechanism 480 is in the first arrangement. In some implementations, the processing apparatus is configured to: determine a warp mapping based on the data received from the non-volatile memory 490; and apply the warp mapping to an image captured using the image sensor 430 when the retaining mechanism 480 is in the first arrangement. In some implementations, the processing apparatus is configured to, responsive to detecting that the accessory lens 472 has been mounted, prompt a user, via a user interface (e.g., the user interface 320), to confirm a lens configuration change. For example, a confirmation prompt may be presented in the interactive display 120. In some implementations, the processing apparatus is configured to, responsive to detecting that the accessory lens 472 has been mounted, automatically identify the accessory lens 472 from among a set of multiple supported accessory lenses. For example, the accessory lens 472 may be identified based on data (e.g., a lens identifier) stored in the non-volatile memory 490 that is received by the processing apparatus.

The accessory lens structure 470 includes a communication interface 492 integrated in the accessory lens structure 470. The communication interface 492 may be used to transfer data from the non-volatile memory 490 to the processing apparatus (e.g., the processing apparatus 312). For example, the processing apparatus may be configured to receive data stored in the non-volatile memory 490 as signals transmitted via the communications interface 492. In some implementations, the communications interface 492 includes a radio-frequency identification tag and the image capture device includes a radio-frequency identification reader configured to read signals from the radio-frequency identification tag. In some implementations, the communications interface 492 includes one or more electrical conductors configured to contact one or more corresponding electrical conductors on the image capture device when the retaining mechanism 480 is in the first arrangement. In some implementations, the communications interface 492 includes a capacitive coupling. In some implementations, the communications interface 492 includes an optical coupling.

In some implementations (not shown in FIGS. 4A-4B), the mother lens 420 is also removeably attached to the lens barrel 410. For example, this structure may allow the mother lens 420 to be replaced in the event that the mother lens 420 is scratched. For example, the mother lens 420 may be fastened at the end of the lens barrel using a fastening mechanism (e.g., a bayonet mechanism, a threaded mechanism, a snap-ring mechanism, or screws), and the accessory lens structure 470 may be fastened over the mother lens 420 using a fastening mechanism to attached the accessory lens structure 470 to the fastening mechanism of the mother lens 420 or another part of the body of the image capture device. In some implementations (not shown in FIGS. 4A-4B), the accessory lens structure 470 includes multiple lens elements stacked over the mother lens 420 when the retaining mechanism 480 is in the first arrangement.

Figure 5A:
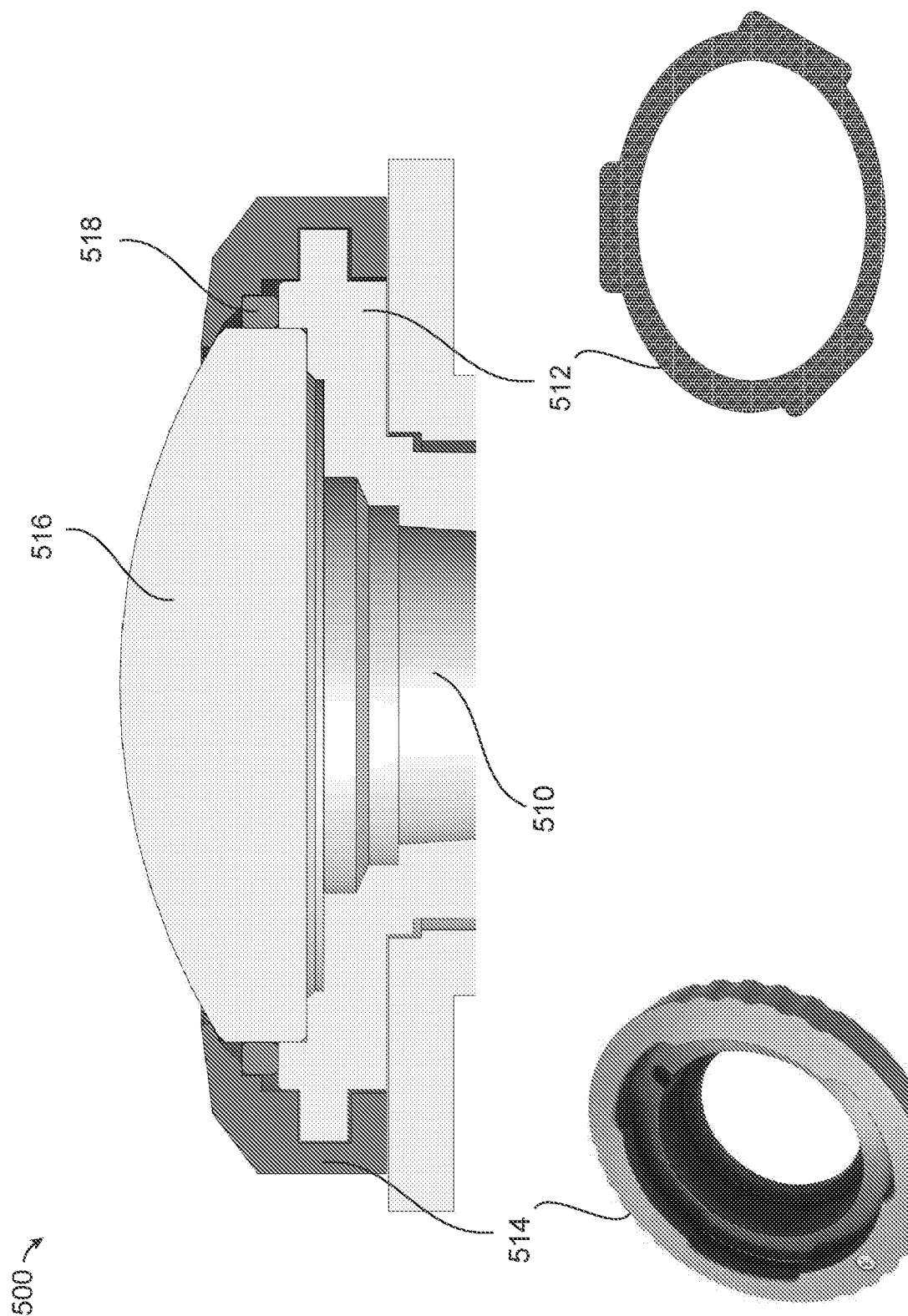
FIG. 5A illustrates an example of an accessory lens structure including a bayonet mechanism.

FIG. 5A illustrates an example of an accessory lens structure 500 including a bayonet mechanism. The accessory lens structure 500 includes a lens barrel 510 (e.g., similar to the lens barrel 410 of FIG. 4B), which may include a mother lens and one or more inner lenses that may be curved. The lens barrel 510 is part of a body of an image capture device that includes a male bayonet ring 512, which may be attached to or otherwise integrated with the lens barrel 510 or another portion of the body. The accessory lens structure 500 includes a retaining ring 514 that includes a female bayonet ring. For example, the retaining ring 514 may be pushed onto the male bayonet ring of the body in an unlocked position and turned to a locked position to fasten the retaining ring 514 to the body and fasten an accessory lens 516 (e.g., the accessory lens 472) in a position covering a first end of the lens barrel 510. The accessory lens structure 500 includes an O-ring 518 that may be positioned radially around the accessory lens 516 and compressed between the retaining ring 514 and the accessory lens 516 and/or the body to waterproof the accessory lens structure 500. The accessory lens structure 500 may offer advantages over alternative lens assemblies, such as robust reusability over many cycles of removing and replacing an accessory lens, over-center locking, an enhanced user experience (e.g., easy to remove/replace), and the retaining ring 514 maybe made sturdy by making the retaining ring 514 out of a strong metal. A drawback may be a relatively large outer diameter of the retaining ring 514.

Figure 5B:
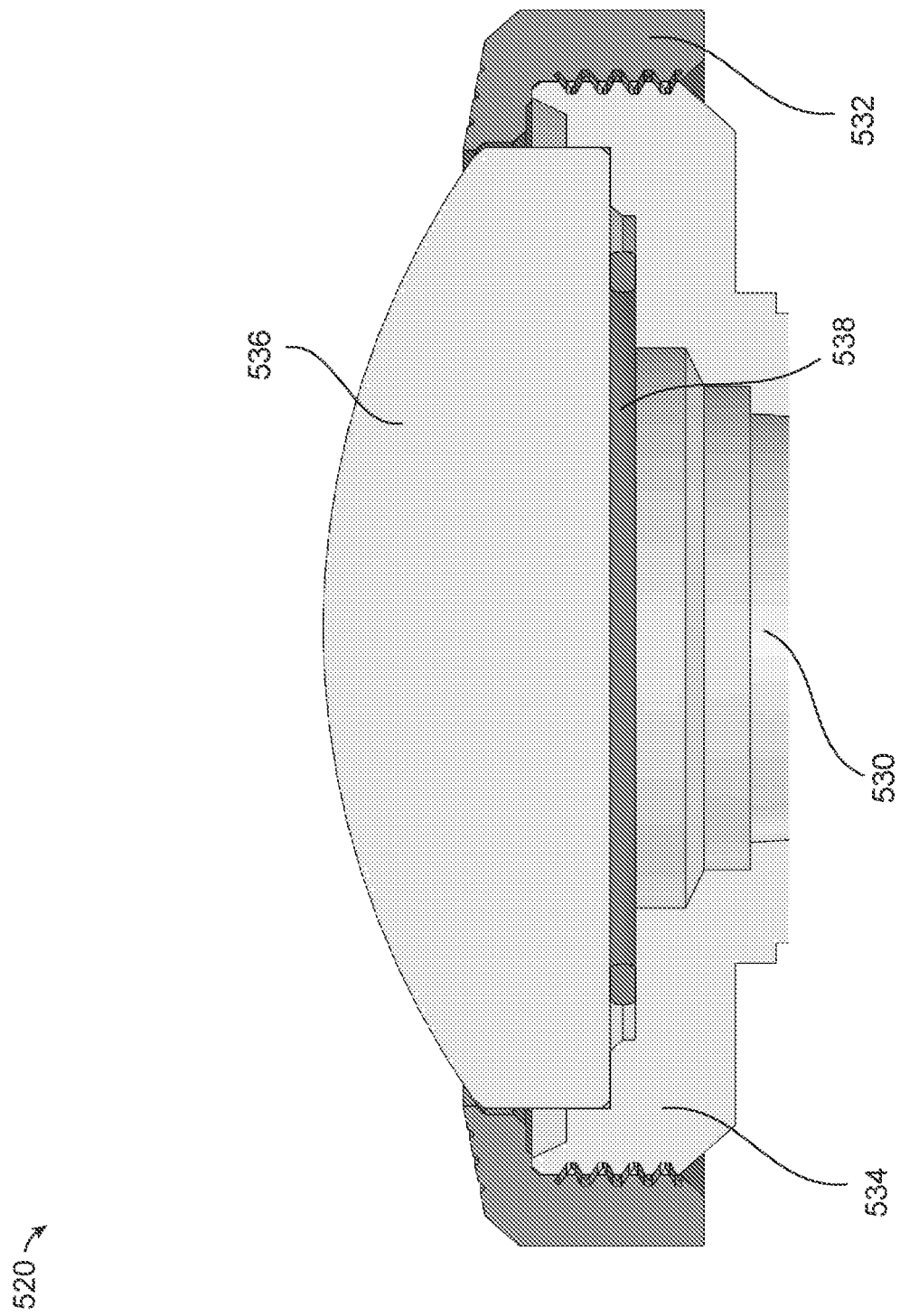
FIG. 5B illustrates an example of an accessory lens structure including a threaded mechanism.

FIG. 5B illustrates an example of an accessory lens structure 520 including a threaded mechanism. The accessory lens structure 520 includes a lens barrel 530 (e.g., similar to the lens barrel 410 of FIG. 4B), which may include a mother lens and one or more inner lenses that may be curved. The lens barrel 530 is part of a body of an image capture device that includes a male threaded interface 534, which may be attached to or otherwise integrated with the lens barrel 530 or another portion of the body. The accessory lens structure 520 includes a retaining ring 532 that includes a female threaded interface. For example, the retaining ring 532 may be twisted onto the male threaded interface 534 of the body to fasten the retaining ring 532 to the body and fasten an accessory lens 536 (e.g., the accessory lens 472) in a position covering a first end of the lens barrel 530. The accessory lens structure 520 includes an O-ring 538 that may be positioned inside (e.g., vertically under) the accessory lens 536 and compressed between the accessory lens 536 and the body (e.g., the lens barrel 530) to waterproof the accessory lens structure 520. The accessory lens structure 520 may offer advantages over alternative lens assemblies, such as a low profile. A drawback may be a risk of cross threading or stripping.

Figure 5C:
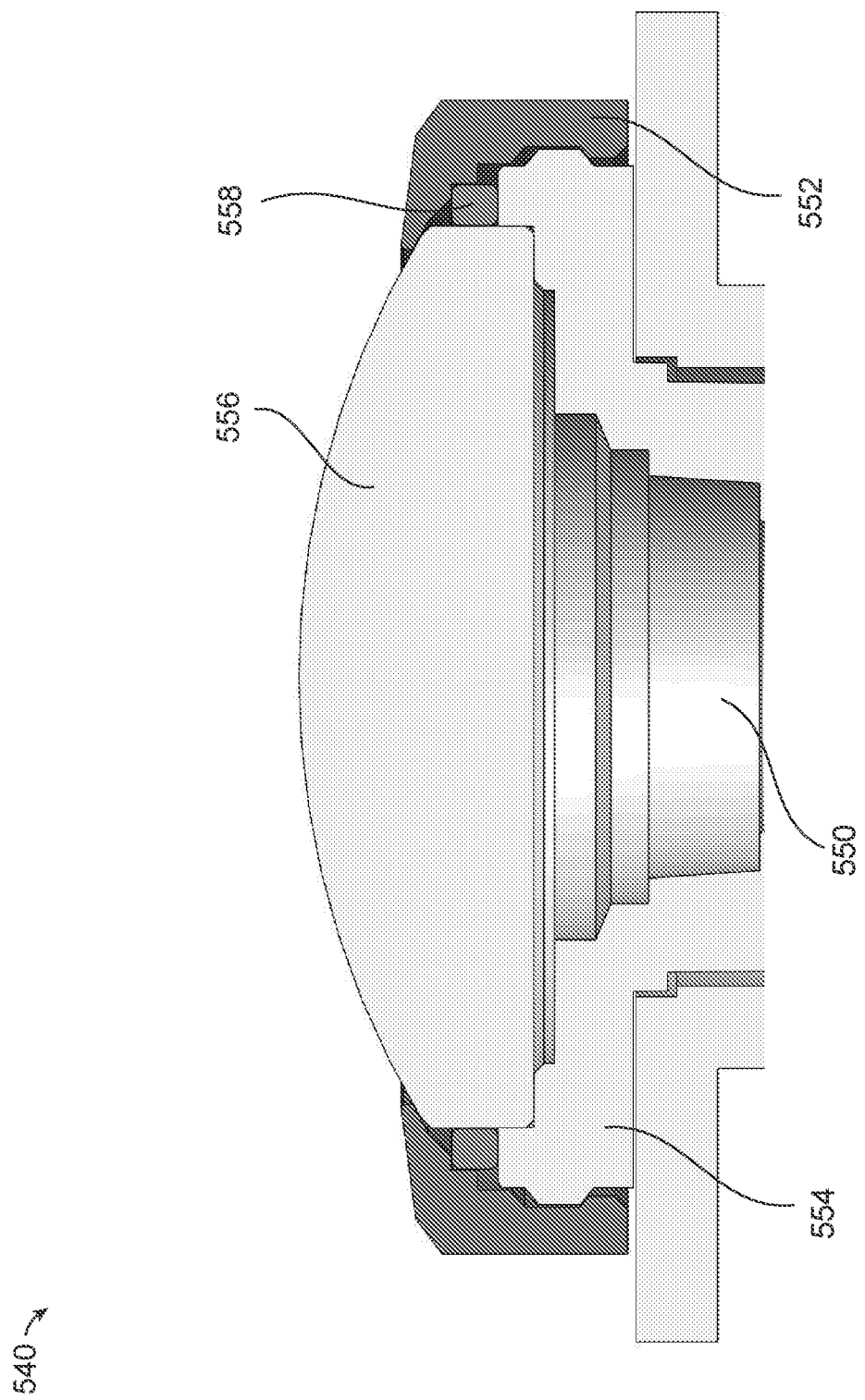
FIG. 5C illustrates an example of an accessory lens structure including a snap-ring mechanism.

FIG. 5C illustrates an example of an accessory lens structure 540 including a snap-ring mechanism. The accessory lens structure 540 includes a lens barrel 550 (e.g., similar to the lens barrel 410 of FIG. 4B), which may include a mother lens and one or more inner lenses that may be curved. The lens barrel 550 is part of a body of an image capture device that includes a male snap-ring interface 554, which may be attached to or otherwise integrated with the lens barrel 550 or another portion of the body. The accessory lens structure 540 includes a retaining ring 552 that includes a female snap-ring interface. For example, the retaining ring 552 may be pushed onto the male snap-ring interface 554 of the body to fasten the retaining ring 552 to the body and fasten an accessory lens 516 (e.g., the accessory lens 472) in a position covering a first end of the lens barrel 550. The accessory lens structure 540 includes an O-ring 558 that may be positioned radially around the accessory lens 556 and compressed between the retaining ring 552 and the accessory lens 556 and/or the body to waterproof the accessory lens structure 540. The accessory lens structure 540 may offer advantages over alternative lens assemblies, such as ease of installation. A drawback may be greater difficulty in removing the retaining ring 552.

Figure 5D:
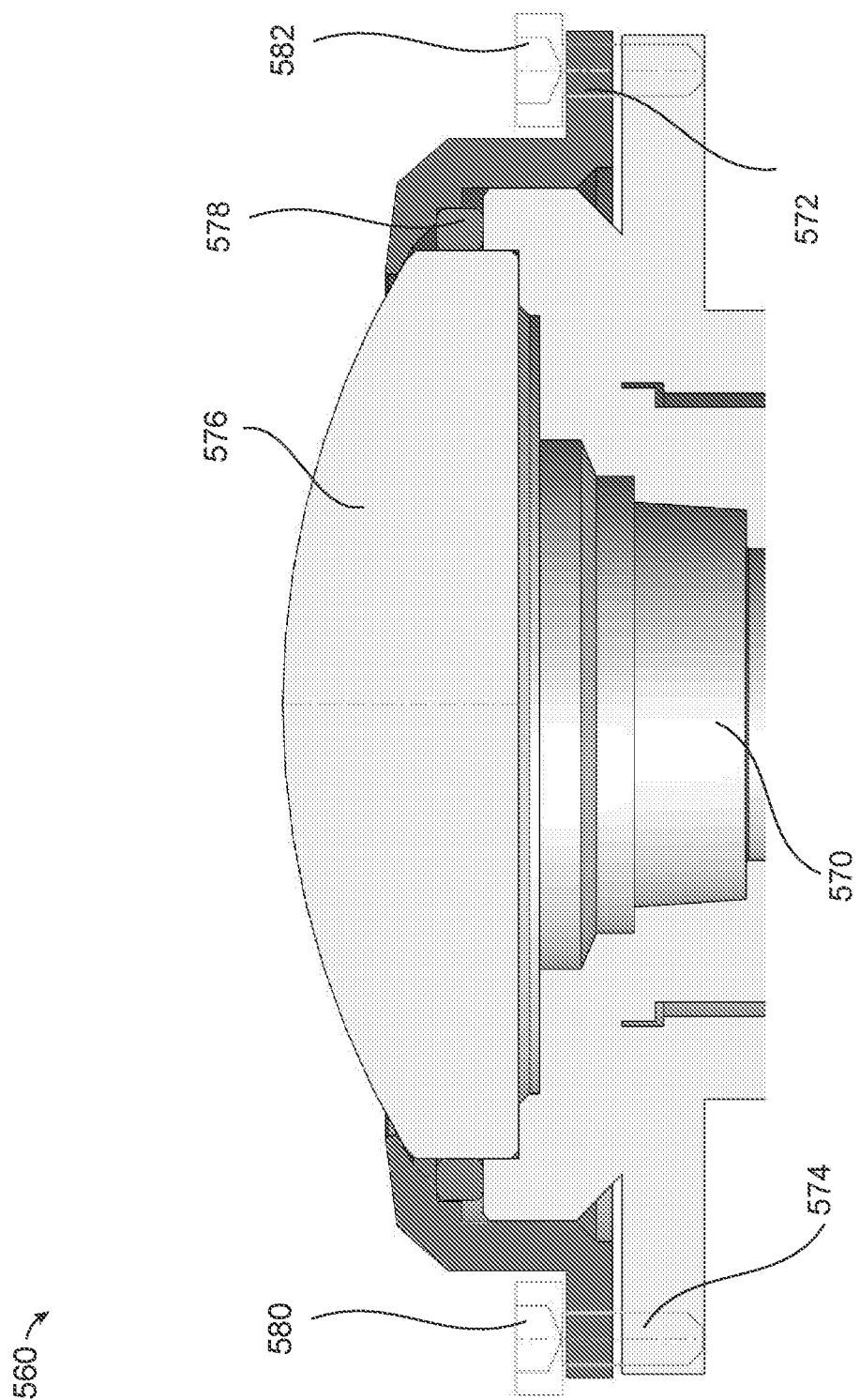
FIG. 5D illustrates an example of an accessory lens structure including screw holes.

FIG. 5D illustrates an example of an accessory lens structure 560 including screw holes. The accessory lens structure 560 includes a lens barrel 570 (e.g., similar to the lens barrel 410 of FIG. 4B), which may include a mother lens and one or more inner lenses that may be curved. The lens barrel 570 is part of a body of an image capture device that includes screw holes 574, which may be attached to or otherwise integrated with the lens barrel 570 or another portion of the body. The accessory lens structure 560 includes a retaining ring 572 that includes screw holes. For example, the retaining ring 572 may be fastened to body by driving screws 580 and 582 through the screw holes of the retaining ring 572, into the screw holes 574 of the body to fasten an accessory lens 516 (e.g., the accessory lens 472) in a position covering a first end of the lens barrel 570. The accessory lens structure 560 includes an O-ring 578 that may be positioned radially around the accessory lens 576 and compressed between the retaining ring 572 and the accessory lens 576 and/or the body to waterproof the accessory lens structure 560. The accessory lens structure 560 may offer advantages over alternative lens assemblies, such as robust fastening of the retaining ring 572 and the accessory lens 576 into position. A drawback may be a large size and poor aesthetics of the retaining ring 572.

FIG. 6 is a flowchart of an example of a process 600 for using an accessory lens structure (e.g., the accessory lens structure 470) with an image capture device. The process 600 includes automatically detecting that an accessory lens structure has been mounted to an image capture device including a mother lens and an image sensor configured to detect light incident through the mother lens, such that an accessory lens of the accessory lens structure is positioned covering the mother lens; responsive to detecting that the accessory lens structure has been mounted, automatically identifying the accessory lens from among a set of multiple supported accessory lenses; accessing an image captured using the image sensor when the accessory lens structure is positioned covering the mother lens; determining a warp mapping based on identification of the accessory lens; applying the warp mapping to the image to obtain a warped image; and transmitting, storing, or displaying an output image based on the warped image. For example, the process 600 may be implemented by an image capture device, such as the image capture device 100 of FIGS. 1A-1D, the image capture device 200 of FIGS. 2A-2B, the image capture device 310 of FIG. 3A, or the image capture device 340 of FIG. 3B.

The process 600 includes automatically detecting 610 that an accessory lens structure (e.g., the accessory lens structure 470) has been mounted to an image capture device including a mother lens (e.g., the mother lens 420) and an image sensor (e.g., the image sensor 430) configured to detect light incident through the mother lens, such that an accessory lens (e.g., the accessory lens 472) of the accessory lens structure is positioned covering the mother lens. Mounting of the accessory lens structure may be detected 610 using a variety of sensing modalities. In some implementations, automatically detecting 610 that the accessory lens structure has been mounted to the image capture device includes using a proximity sensor integrated in the image capture device. For example, a magnetically actuated switch may be integrated in the image capture device near the lens assembly including the mother lens, and the magnetically actuated switch may be used to detect 610 the presence of a magnet that is integrated in the accessory lens structure (e.g., in a plastic interface ring attached to a base of the accessory lens). For example, a capacitive coupling between a device integrated in the accessory lens structure and a device integrated in the image capture device may be used to detect 610 when the accessory lens structure has been mounted. For example, the accessory lens structure and a portion of the body of the image capture device (e.g., a lens barrel) may include respective electrical contacts that come into contact with each other when the accessory lens structure is mounted. In some implementations, automatically detecting 610 that the accessory lens structure has been mounted to the image capture device includes detecting a change in image sensor coverage of the image sensor. For example, the image sensor coverage may be monitored and when a change in the coverage corresponding to the mounting of the accessory lens structure may be detected 610 when the accessory lens structure is mounted. In some implementations, the process 600 includes, responsive to detecting 610 that the accessory lens has been mounted, prompting a user, via a user interface (e.g., the user interface 320), to confirm a lens configuration change. Prompting a user to confirm the mounting may prevent false detections in some circumstances.

The process 600 includes, responsive to detecting that the accessory lens structure has been mounted, automatically identifying 620 the accessory lens from among a set of multiple supported accessory lenses. In some implementations, automatically identifying 620 the accessory lens includes receiving data from a non-volatile memory (e.g., the non-volatile memory 490) integrated in the accessory lens structure. For example, the data from the non-volatile memory may include an identifier for the accessory lens or other identifying information, such as optical parameters or configuration parameters for an image signal processor. Data from the non-volatile memory may be received via communications interface integrated in the accessory lens structure with the non-volatile memory. For example, the accessory lens structure may include a radio frequency identification (RFID) tag, and the image capture device may include an RFID reader configured to read data from the non-volatile memory of the RFID tag. Other types of communication interfaces may be used to receive data from the non-volatile memory, such as a capacitive coupling, an optical coupling, one or more electrical conductors that meet at one or more electrical contacts between the accessory lens structure and the image capture device when the accessory lens structure is mounted. In some implementations, a bar code on the accessory lens structure is read by an optical bar code reader integrated in the image capture device when the accessory lens structure is mounted. In some implementations, automatically identifying 620 the accessory lens includes comparing image sensor coverage of the image sensor to an image sensor coverage profile associated with the accessory lens.

The process 600 includes accessing 630 an image (e.g., a still image or a frame of video) captured using the image sensor when the accessory lens structure is positioned covering the mother lens. For example, the input image may be accessed 630 from an image sensor (e.g., the image sensor 430 or the image sensor 314) via a bus (e.g., the bus 324). In some implementations, the input image may be accessed 630 via a communications link (e.g., the communications link 350). For example, the input image may be accessed 630 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the input image may be accessed 630 via communications interface 366. For example, the input image may be accessed 630 via a front ISP that performs some initial processing on the accessed 630 input image. For example, the input image may represent each pixel value in a defined format, such as in a RAW image signal format, a YUV image signal format, or a compressed format (e.g., an MPEG or JPEG compressed bitstream). For example, the input image may be stored in a format using the Bayer color mosaic pattern.

The process 600 includes determining 640 a warp mapping based on identification of the accessory lens. For example, the warp mapping may include a lens distortion correction that is determined based on the identification of the accessory lens. For example, identification of the accessory lens may be made based on data read from a non-volatile memory integrated in the accessory lens structure. In some implementations, the data from the non-volatile memory includes parameters of the warp mapping (e.g., parameters of a lens distortion correction transformation) that are used to determine 640 the warp mapping. In some implementations, the data from the non-volatile memory includes optical parameters (e.g., optical parameters of the accessory lens or optical parameters of a lens stack including the accessory lens and the mother lens), and the warp mapping is determined 640 based on these optical parameters. For example, the warp mapping may include a series of transformations, such as lens distortion correction, electronic rolling shutter correction, and parallax correction (for implementations with using two or more image sensors).

The process 600 includes applying 650 the warp mapping to the image to obtain a warped image. For example, the warp mapping may specify the determination of image portions (e.g., pixels or blocks of pixels) of the warped image based on linear combinations of one or more corresponding image portions of the image and/or one or more corresponding image portions of an image captured with another image sensor of the image capture device.

For example, the accessory lens may be used to facilitate robust electronic image stabilization in some use cases. In some implementations, when the accessory lens structure is positioned covering the mother lens, a field of view of a lens stack including the accessory lens and the mother lens is projected as a circle within a detectable area of the image sensor. Although not explicitly shown in FIG. 6, the process 600 may also include applying an electronic image stabilization rotation to the image to obtain a stabilized image; and cropping the stabilized image to a rectangular output image from within the circle (e.g., as described in relation to the process 700 of FIG. 7).

The process 600 includes transmitting, storing, or displaying 660 an output image based on the warped image. For example, the output image may be transmitted 660 to an external device (e.g., a personal computing device) for display or storage. For example, the output image may be the same as the warped image. For example, the output image may be a composite image determined by stitching an image based on the output image to one or more images from other image sensors with overlapping fields of view. For example, the output image may be an electronically stabilized image based on the warped image. For example, the output image may be compressed using an encoder (e.g., an MPEG encoder). For example, the output image may be transmitted 660 via the communications interface 318. For example, the output image may be displayed 660 in the user interface 320 or in the user interface 364. For example, the output image may be stored 660 in memory of the processing apparatus 312 or in memory of the processing apparatus 362.

FIG. 7 is a flowchart of an example of a process 700 for improving electronic image stabilization using an accessory lens structure with an image capture device. The image capture device includes a mother lens (e.g., the mother lens 420) and an image sensor (e.g., the image sensor 430) configured to detect light incident through the mother lens. The accessory lens structure (e.g., the accessory lens structure 470) includes an accessory lens (e.g., the accessory lens 472) and a retaining mechanism (e.g., the retaining mechanism 480) configured to fasten the accessory lens in a position covering the mother lens in a first arrangement and configured to disconnect the accessory lens from the image capture device in a second arrangement. In this example, the accessory lens augments optical properties of a lens stack over the image sensor that includes the mother lens, such that a field of view of the lens stack is projected as a circle within a detectable area of the image sensor, when the retaining mechanism is in the first arrangement. The process 700 includes accessing 710 an image captured using the image sensor when the retaining mechanism is in the first arrangement; applying 720 an electronic image stabilization rotation to the image to obtain a stabilized image; and cropping 730 the stabilized image to a rectangular output image from within the circle. For example, the process 600 may be implemented by an image capture device, such as the image capture device 100 of FIGS. 1A-1D, the image capture device 200 of FIGS. 2A-2B, the image capture device 310 of FIG. 3A, or the image capture device 340 of FIG. 3B.

For example, the image capture device may include a processing apparatus integrated in the image capture device. In some implementations, the processing apparatus is configured to automatically detect 610 when the retaining mechanism is in the first arrangement. In some implementations, the processing apparatus is configured to, responsive to detecting that the accessory lens structure has been mounted, prompt a user, via a user interface (e.g., the interactive display 120), to confirm a lens configuration change. In some implementations, the processing apparatus is configured to, responsive to detecting that the accessory lens structure has been mounted, automatically identify 620 the accessory lens from among a set of multiple supported accessory lenses.

The process 700 includes accessing 710 an image (e.g., a still image or a frame of video) captured using the image sensor when the retaining mechanism is in the first arrangement. For example, the input image may be accessed 710 from an image sensor (e.g., the image sensor 430 or the image sensor 314) via a bus (e.g., the bus 324). In some implementations, the input image may be accessed 710 via a communications link (e.g., the communications link 350). For example, the input image may be accessed 710 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the input image may be accessed 710 via communications interface 366. For example, the input image may be accessed 710 via a front ISP that performs some initial processing on the accessed 710 input image. For example, the input image may represent each pixel value in a defined format, such as in a RAW image signal format, a YUV image signal format, or a compressed format (e.g., an MPEG or JPEG compressed bitstream). For example, the input image may be stored in a format using the Bayer color mosaic pattern.

The process 700 includes applying 720 an electronic image stabilization rotation to the image to obtain a stabilized image. For example, the electronic image stabilization rotation may be applied 720 to a portion (e.g., pixel or block of pixels) of the image. For example, a portion of the stabilized image may be shifted to a new address or position within the stabilized image based on the electronic image stabilization rotation. For example, the electronic image stabilization rotation may be applied 720 to all portions of the image within the field of view. In some implementations, the electronic image stabilization rotation may be determined based on angular rate measurements for the image capture device including the image sensor used to capture the image. For example, the electronic image stabilization rotation may be determined based on motion sensor (e.g., gyroscope and/or accelerometer) measurements from a time associated with the capture of the image. Because the field of view of the lens stack is projected as a circle within a detectable area of the image sensor, the image may be well suited to the application of significant electronic image stabilization rotation, resulting in little or no distortion due to edge effects.

The process 700 includes cropping 730 the stabilized image to a rectangular output image from within the circle. For example, the stabilized image may be cropped 730 to a rectangular output image to conform to an image or video encoding format or a display format.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   an image capture device including:
   a body;
   a mother lens; and
   an image sensor configured to detect light incident through the mother lens,
   wherein the mother lens and the image sensor are located within the body;
   an accessory lens structure including an accessory lens and a retaining mechanism configured to fasten the accessory lens in a position covering the mother lens in a first arrangement and configured to disconnect the accessory lens from the image capture device in a second arrangement, wherein the accessory lens augments optical properties of a lens stack over the image sensor that includes the mother lens when the retaining mechanism is in the first arrangement;
   a non-volatile memory storing more than two bits of data that is integrated in the accessory lens structure; and
   a processing apparatus that is integrated in the image capture device and configured to receive data that is stored in the non-volatile memory when the retaining mechanism is in the first arrangement.

2. The system of claim 1, wherein the non-volatile memory stores at least one of an identifier of the accessory lens, calibration data of the accessory lens, or optical parameters of the accessory lens.

3. The system of claim 1, further comprising a communication interface that is integrated in the accessory lens structure, wherein the processing apparatus is configured to:
   receive data stored in the non-volatile memory as signals transmitted via the communications interface.

4. The system of claim 3, wherein the communications interface includes a radio-frequency identification tag and the image capture device includes a radio-frequency identification reader configured to read signals from the radio-frequency identification tag.

5. The system of claim 3, wherein the communications interface includes one or more electrical conductors configured to contact one or more corresponding electrical conductors on the image capture device when the retaining mechanism is in the first arrangement.

6. The system of claim 1, wherein the processing apparatus is configured to:
   determine a warp mapping based on the data received from the non-volatile memory; and
   apply the warp mapping to an image captured using the image sensor when the retaining mechanism is in the first arrangement.

7. The system of claim 1, wherein the processing apparatus is configured to:
   automatically detect when the retaining mechanism is in the first arrangement.

8. The system of claim 7, wherein the processing apparatus is configured to:
   responsive to detecting that the accessory lens structure has been mounted, prompt a user, via a user interface, to confirm a lens configuration change.

9. The system of claim 7, wherein the processing apparatus is configured to:
   responsive to detecting that the accessory lens structure has been mounted, automatically identify the accessory lens from among a set of multiple supported accessory lenses.

10. The system of claim 1, wherein a field of view of the lens stack is projected as a circle within a detectable area of the image sensor when the retaining mechanism is in the first arrangement, and wherein the processing apparatus is configured to:
    access an image captured using the image sensor when the retaining mechanism is in the first arrangement;
    apply an electronic image stabilization rotation to the image to obtain a stabilized image; and
    crop the stabilized image to a rectangular output image from within the circle.

11. A system comprising:
    an image capture device including a mother lens and an image sensor configured to detect light incident through the mother lens;
    an accessory lens structure including an accessory lens and a retaining mechanism configured to fasten the accessory lens in a position covering the mother lens in a first arrangement and configured to disconnect the accessory lens from the image capture device in a second arrangement, wherein the accessory lens augments optical properties of a lens stack over the image sensor that includes the mother lens, such that a field of view of the lens stack is projected as a circle within a detectable area of the image sensor, when the retaining mechanism is in the first arrangement; and
    a processing apparatus that is integrated in the image capture device and configured to:
    access an image captured using the image sensor when the retaining mechanism is in the first arrangement;

apply an electronic image stabilization rotation to the image to obtain a stabilized image; and crop the stabilized image to a rectangular output image from within the circle.

12. The system of claim 11, wherein the processing apparatus is configured to:

automatically detect when the retaining mechanism is in the first arrangement.

13. The system of claim 12, wherein the processing apparatus is configured to:

responsive to detecting that the accessory lens structure has been mounted, prompt a user, via a user interface, to confirm a lens configuration change.

14. The system of claim 12, wherein the processing apparatus is configured to:

responsive to detecting that the accessory lens structure has been mounted, automatically identify the accessory lens from among a set of multiple supported accessory lenses.

15. A method comprising:

automatically detecting that an accessory lens structure has been mounted to an image capture device including a mother lens and an image sensor configured to detect light incident through the mother lens, such that an accessory lens of the accessory lens structure is positioned covering the mother lens;

responsive to detecting that the accessory lens structure has been mounted, automatically identifying the accessory lens from among a set of multiple supported accessory lenses;

accessing an image captured using the image sensor when the accessory lens structure is positioned covering the mother lens;

determining a warp mapping based on identification of the accessory lens;

applying the warp mapping to the image to obtain a warped image; and transmitting, storing, or displaying an output image based on the warped image.

16. The method of claim 15, wherein, when the accessory lens structure is positioned covering the mother lens, a field of view of a lens stack including the accessory lens and the mother lens is projected as a circle within a detectable area of the image sensor, the method comprising:

applying an electronic image stabilization rotation to the image to obtain a stabilized image; and cropping the stabilized image to a rectangular output image from within the circle.

17. The method of claim 15, comprising:

responsive to detecting that the accessory lens structure has been mounted, prompting a user, via a user interface, to confirm a lens configuration change.

18. The method of claim 15, wherein automatically detecting that the accessory lens structure has been mounted to the image capture device comprises:

using a proximity sensor integrated in the image capture device.

19. The method of claim 15, wherein automatically detecting that the accessory lens structure has been mounted to the image capture device comprises:

detecting a change in image sensor coverage of the image sensor.

20. The method of claim 15, wherein automatically identifying the accessory lens comprises at least one of:

receiving data from a non-volatile memory integrated in the accessory lens structure; or comparing image sensor coverage of the image sensor to an image sensor coverage profile associated with the accessory lens.

* * * * *